United States Patent [19]
Bernard

[11] Patent Number: 5,260,088
[45] Date of Patent: Nov. 9, 1993

[54] PROCESS OF MAKING CHOPPER SUN DRIED TOMATOES AND PRODUCT THEREOF

[76] Inventor: David J. Bernard, 2521 Sun Flower Dr., Arlington, Tex. 76014

[21] Appl. No.: 3,519

[22] Filed: Jan. 12, 1993

[51] Int. Cl.$^5$ ............................................. A23L 1/212
[52] U.S. Cl. .................................. 426/615; 426/443; 426/464; 426/465; 426/473
[58] Field of Search ............... 426/615, 473, 443, 464, 426/465

[56] References Cited

U.S. PATENT DOCUMENTS

| | | | |
|---|---|---|---|
| 942,287 | 12/1909 | Schroen | 426/464 |
| 1,236,831 | 8/1917 | Fatica | 426/615 |
| 1,586,893 | 6/1926 | Gay | 426/473 |
| 1,929,437 | 10/1933 | McComb | 99/5 |
| 3,311,478 | 3/1967 | Robarge | 99/208 |
| 3,378,380 | 4/1968 | Yamamoto et al. | 99/204 |
| 3,973,047 | 8/1976 | Linaberry et al. | 426/473 |
| 4,031,266 | 6/1977 | Mitchell et al. | 426/599 |
| 4,985,267 | 1/1991 | De Cuadros | 426/473 |
| 5,035,909 | 7/1991 | Lomelin et al. | 426/473 |

OTHER PUBLICATIONS

Copley, et al. 1964, vol. II Food Dehydration, Avi Publishing Co., Inc. Westport, Connecticut, p. 294.
Hobart Instruction Manual ... with Replacement Parts, Form 10546A (Rev. 1-77), Hobart Corporation, Ohio.

Primary Examiner—Helen F. Pratt
Attorney, Agent, or Firm—Baker & Botts

[57] ABSTRACT

Tomatoes are washed, sliced, sun dried on drying screens to a moisture content of 7% to 12% and mechanically chopped to ¼" to ½" nodules which increases the moisture content from 18.5% to 21.8% and then packaged.

15 Claims, 2 Drawing Sheets

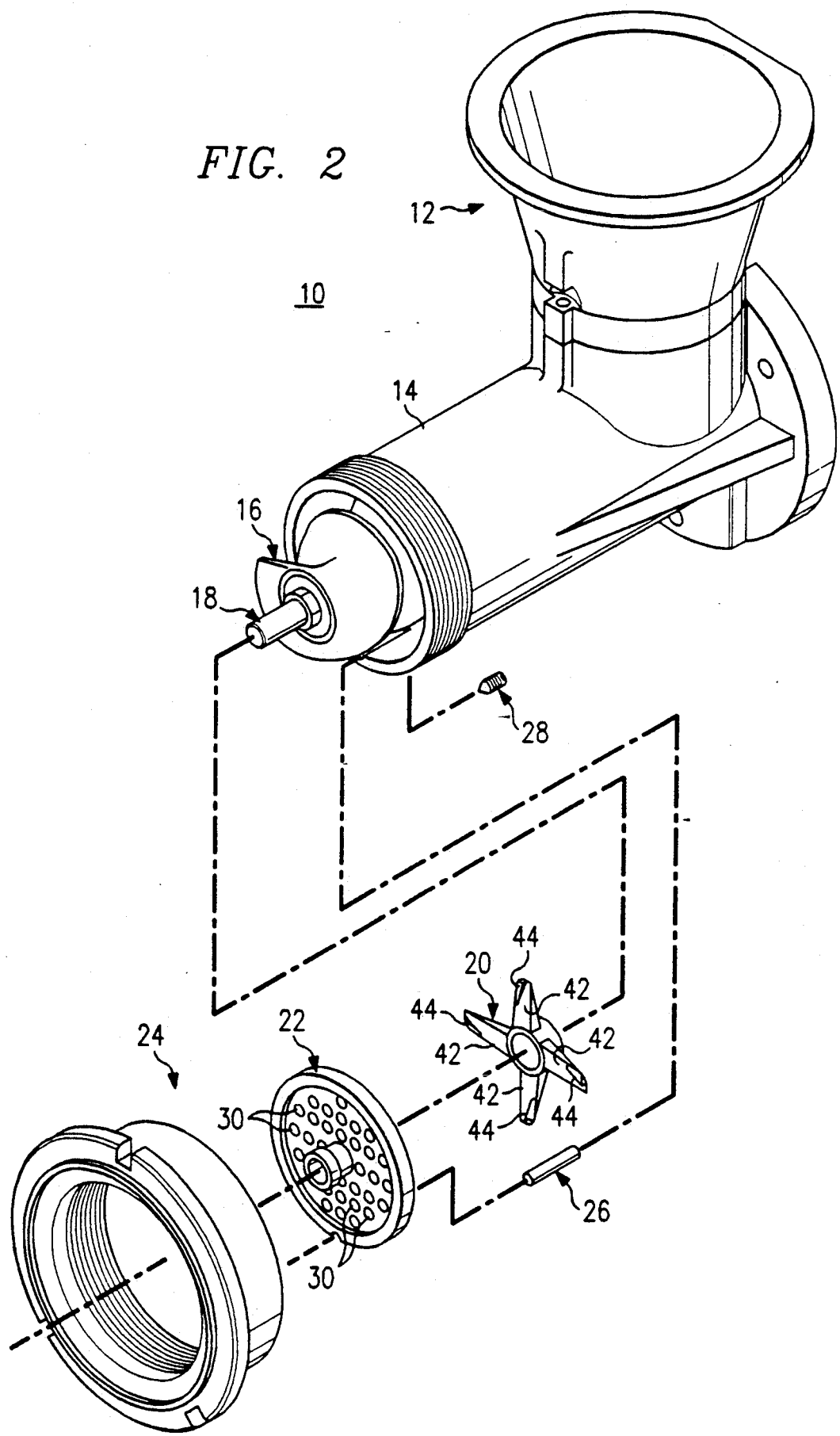

PROCESS OF MAKING CHOPPER SUN DRIED TOMATOES AND PRODUCT THEREOF

TECHNICAL FIELD OF THE INVENTION

This invention relates in general to the field of dried tomatoes, and more particularly to an improved method for making chopped dried tomatoes, while retaining the moisture and nutritional values of natural tomatoes.

BACKGROUND OF THE INVENTION

For more than 150 years, sun dried tomatoes have been used in preparing salads, soups, pasta, casserole and other Italian and American cuisine. Dried tomatoes, like other dried fruits and vegetables, have several benefits over their fresh counterparts. Bulk dried vegetables can be shipped and stored without special handling required for fresh vegetables. Also, dried vegetables can be stored without the special refrigeration that is necessary for fresh vegetables. Dried vegetables also have extended useful lives.

Traditional methods of drying tomatoes in addition to sun drying include the use of ovens and other heating or dehydrating equipment. Typically, tomatoes are dehydrated with a moisture content of less than 4%. An example of a dehydrating process is shown in U.S. Pat. No. 5,035,909 to Juan M. Lomelin, et al. The process of dehydrating tomatoes often requires expensive machinery and monitoring equipment to ensure that the tomatoes are properly dried without contamination of the tomatoes. These measures attempt to achieve the proper moisture content without destroying the flavor and taste of the tomatoes.

Dehydration techniques generally require the addition of additives and preservatives for the dried tomatoes to retain the flavor, vitamin and mineral content of fresh tomatoes. Dehydrated tomatoes are typically provided in granulated powder form. Dehydrated tomatoes must therefore be reconstituted, i.e., boiled in water for a period of time, before the reconstituted tomatoes can be used in food preparation. U.S. Pat. No. 4,031,266 to William A. Mitchell, et al. provides examples of reconstitutable tomato compositions.

Past approaches to produce chopped dried tomatoes on a commercial scale have not been successful. The elasticity of dried tomatoes is incompatible with prior art chopping machines. Prior art chopping machines pulverize dried tomatoes resulting in either granulated powder tomatoes much like the dehydrated tomatoes discussed above and/or clogging of the chopping machine which often burned out the associated motor. U.S. Pat. No. 3,311,478 to C. W. Robarge shows food processing equipment which may be satisfactorily modified for use with the present invention.

Therefore, a need has arisen for an effective and economical process to produce chopped dried tomatoes which can be used for culinary purposes without the use of expensive dehydration equipment and extended reconstitution procedures.

SUMMARY OF THE INVENTION

In accordance with the present invention, the disadvantages and problems associated with previous systems and methods for preparing chopped dried tomatoes from fresh tomatoes have been reduced or eliminated by using the present invention.

In accordance with one aspect of the invention, tomatoes are grown and picked once they are sufficiently ripe. The picked tomatoes are washed and sliced. The sliced tomatoes are then dried. The sliced dried tomatoes are next chopped in a chopping machine into $\frac{1}{4}''$ to $\frac{1}{2}''$ nodules. The chopped dried tomatoes are packaged and stored until ready for shipment. More specifically, the tomatoes are preferably dried on drying screens, in the open air, under the sun in 90° to 108° F. for $3\frac{1}{2}$ days to $5\frac{1}{2}$ days. Also, more specifically, the chopped dried tomatoes may be seasoned for taste.

The present invention includes a tomato chopping device which can chop bulk dried tomatoes into small nodules. Food processing equipment incorporating the present invention breaks down the bulk dried tomatoes during the mechanical process of chopping by creating heat and adding moisture. After the chopped dried tomatoes leave the processing equipment, they return to the texture, consistency and flavor of bulk dried tomatoes, but their size ($\frac{1}{4}''$ to $\frac{1}{2}''$) is satisfactory for use in food preparation without further processing or reconstitution.

One technical advantage of the present invention is chopping sun dried tomatoes with an economical, off-the-shelf grinder with proper modifications. The chopping equipment is compact and well suited for food processing. The chopping equipment provides chopped dried tomatoes with different nodule sizes as desired.

Another benefit of the present invention is that the chopped dried tomatoes do not have to be reconstituted before they are used. Chopped dried tomatoes substantially reduce costs to restaurants since reconstituting chopped dried tomatoes for use in food preparation is not required. Using chopped dried tomatoes reduces the cost of preparing meals while at the same time provides a product with the flavor and texture of fresh tomatoes. The chopped dried tomatoes of the present invention enjoy the other benefits of dried vegetables in reduced storage and processing costs and an extended useful life.

Another benefit of the present invention is that it produces chopped sun dried tomatoes that are 100% natural. The process of the present invention does not make use of any additives or preservatives. The chopped dried tomatoes have the original color, aroma and flavor of fresh tomatoes. Chopped sun dried tomatoes produced by the present invention contain suit concentrations of protein, vitamins A and C, niacin, thiamine, riboflavin, sodium, calcium and iron. They also have improved organoleptic and rheological characteristics over reconstituted dehydrated tomatoes. Also, chopped sun dried tomatoes produced by the process of the present invention have the distinctive rich flavor and taste of fresh tomatoes.

BRIEF DESCRIPTION OF THE DRAWINGS

For a more complete understanding of the present invention and the advantages thereof, reference is now made to the following description taken in conjunction with the accompanying drawings in which:

FIG. 2 is a drawing in elevation and in section with portions broken away showing the food processing equipment modified in accordance with the present invention for producing chopped dried tomatoes.

DETAILED DESCRIPTION OF THE INVENTION

Figure 1:
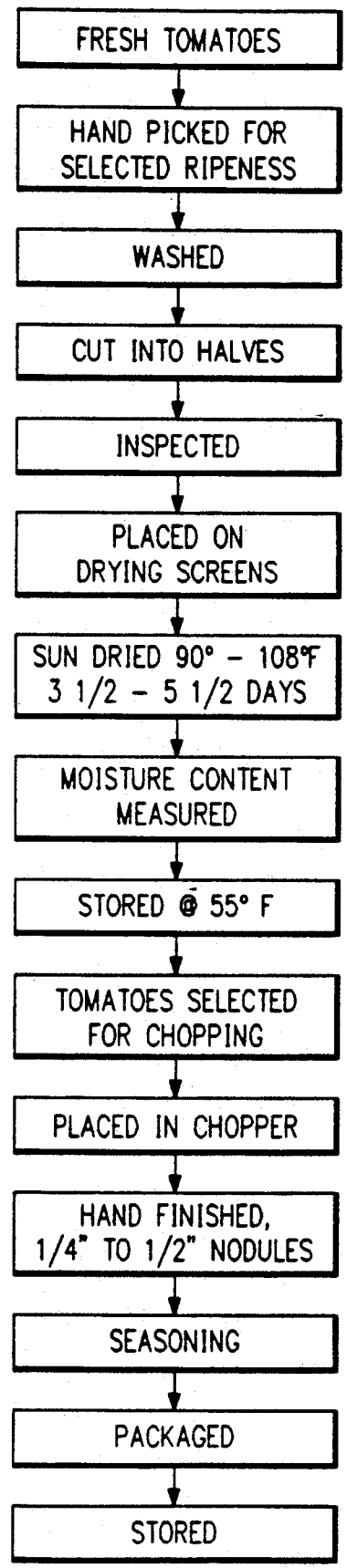
FIG. 1 is a flow diagram for one embodiment of the present invention.

The preferred embodiments of the present invention and its advantages are best understood by referring to FIGS. 1 and 2 of the drawings, like numerals being used for like and corresponding parts of the various drawings.

FIG. 1 depicts the steps of producing chopped dried tomatoes. Fresh tomatoes are preferred for processing. Varieties such as 1017, 6309 and Bergade (cannery) tomatoes have been successfully used for drying and processing within the present invention. The size, shape, flavor and meaty texture of these tomatoes make them ideal. Sufficiently ripe tomatoes are hand picked. Not all of the tomatoes from a given plant are removed from a plant at the same time, but rather, only those that are at the selected stage of ripeness. Tomatoes that experience inadequate ripening, contamination by molds or insects, or physical damage, are not suitable to be dried and processed in accordance with the present invention. After picking, the tomatoes are washed with cold water to cool the fruit, and to prevent the tomatoes from becoming soft.

The tomatoes are then cut in half. A proper cut of the tomato is passing through the center of the tomato from the top stem to the bottom of the tomato. Properly cut tomatoes are then ready for drying. A cutting machine can be used to cut the tomatoes in half. The tomatoes are inspected after cutting to ensure proper cut, color, and size. Again, any inadequate tomatoes are removed prior to further processing.

In one embodiment of the present invention, the cut tomatoes are dried in the open air under the sun in a dry yard on drying screens (not shown). Typical drying screens are 50 feet to 100 feet long, 36 inches wide, and 36 inches off the ground, but screens with other dimensions are also suitable. The top surface of the screens is coated wire which allows sufficient air to pass, yet dense enough to hold the cut tomatoes. The tomatoes are placed by hand onto the drying screens. The tomatoes are turned with their cut side up and again inspected. Once the tomatoes are on the drying screen with the cut side up, they are salted with a very fine flow salt. The salting process eliminates mold and keeps away insects, and also provides flavor.

The tomatoes are then sun dried at the desired temperature range of 90° to 108° F. for a period of $3\frac{1}{2}$ to $5\frac{1}{2}$ days depending on humidity and heat. Daily inspection and culling takes place to ensure proper drying, quality and color of the tomatoes. In the event of rain, the drying tomatoes must be covered.

Once the drying tomatoes have a moisture content of 7% to 15% they are removed from the drying screens. A moisture content of 7% to 15% is preferably maintained after the bulk dried tomatoes are removed from the drying screens and placed in transport containers (not shown). The dried tomato halves are preferably stored in refrigeration units (not shown) with temperature settings at approximately 55° F. Moisture levels can be increased or decreased by adjusting the temperature and humidity levels in the refrigeration units. Moisture in the tomatoes may range as high as 17% before mold will occur and discoloration of the dried tomato halves commences.

Bulk dried tomatoes are then selected for chopping. The dried tomato halves are placed in food processing equipment frequently referred to as a chopper. The dried tomatoes are forced through the chopper to produce chopped dried tomato nodules of $\frac{1}{4}''$ to $\frac{1}{2}''$ as desired. The chopped dried tomato nodules are hand-finished or separated as they exit from the chopper. Natural seasoning may be added to the chopped dried tomatoes to achieve desired flavoring at this point. Alternatively, seasoning may be added after the chopped dried tomatoes have been shipped to other locations. The chopped dried tomatoes are then packaged and stored until shipment. An important element of the present invention is that the final finished product may be shipped and stored without further refrigeration.

Referring to FIG. 2, food processing equipment or chopper 10 of the present invention is depicted. Chopper 10 is used to chop bulk dried tomato halves. Chopper 10 includes a bowl 12, cylinder 14, worm assembly 16, shaft 18, knife 20, end plate 22, retainer ring 24, alignment pin 26, and retainer screw 28. Chopper 10 is driven by a suitable power source, not shown. During operation of chopper 10, the dried tomatoes are fed into bowl 12 and forced down until they are engaged by worm assembly 16. Worm assembly 16 forces the dried tomatoes through cylinder 14 to knife 20 and end plate 22. The knife 20 is driven by shaft 18, and the spacing between knife 20 and end plate 22 determines the size of the chopped dried tomato nodules exiting chopper 10 at retainer ring 24. Pin 26 and retainer screw 28 cooperate to secure end plate 22 and retainer ring 24 from rotating around shaft 18. End plate 22 holds the dried tomato while the rotating knife 20 chops it. Commercially available Hobart model 4156 grinder, modified with special knife 20 and a thinner end plate 22 has been successfully used.

Special knife 20 is required so that the dried tomatoes are cut rather than pulverized as in prior art machines. Knife 20 preferably has four blades 42. Each blade 42 preferably has a finely honed end portion 44 which is sharpened and ground for cutting dried tomato halves. End plate 22 is also modified from those on commercially available grinders. The portion of end plate 22 having the holes 30 through which the dried tomato nodules pass, has its width reduced relative to the outer rim of end plate 22. The reduced width allows the dried tomatoes to pass more easily through the chopper 10. Special knife 20 and end plate 22 allow the chopper 10 to produce chopped dried tomatoes nodules of $\frac{1}{4}''$ to $\frac{1}{2}''$ in size.

The chopped tomato nodules are warm and moist when they exit the chopper 10. The heat generated by the cranking of worm assembly 16 in cylinder 14, and the action between knife 20 and end plate 22 create moisture in the previously dried tomato halves as they are chopped. Adding moisture changes the consistency of the dried tomatoes and allows them to be chopped rather than pulverized or crushed as frequently occurs with dehydrated tomatoes. Chopper 10, therefore, performs the necessary chopping, but also reconstitutes the dried tomatoes. The final chopped product may be hand-finished as required as it exits chopper 10. Hand finishing involves breaking apart any pieces that have not been totally separated by chopper 10.

The steps and chopper identified above provide chopped tomato nodules with a moisture level between 18.5% and 21.8%. Chopped tomatoes with this moisture level are desirable because they have a suitable texture, flavor and color content, and may be used in food preparation without reconstitution. When the tomatoes are dried in the sun, a 100% natural product results and the dried tomatoes have significant levels of protein, vitamins A and C, niacin, thiamine, riboflavin, sodium, calcium and iron. The chopped dried tomatoes also have improved organoleptic and rheological characteristics over reconstituted dehydrated tomatoes. The chopped dried tomatoes also have the taste and flavor of fresh tomatoes results.

Tomatoes, which have been fully or partially mechanically dried or dehydrated, may be satisfactorily used with the present invention. However, 100% sun dried tomatoes are preferred.

Although the present invention has been described in detail, it should be understood that various changes, substitutions and alterations can be made without departing from the spirit and scope of the invention as defined in the following claims.

I claim:

1. A process for producing chopped sun dried tomatoes, comprising the steps of:
    picking tomatoes of sufficient ripeness;
    washing the picked tomatoes and selecting tomatoes for further processing;
    slicing the selected tomatoes;
    drying the sliced tomatoes in open air under the sun until the tomato slices have a moisture content of 7% to 15%;
    selecting sun dried tomato slices for chopping;
    chopping the selected sun dried tomato slices in a chopper to produce tomato nodules having a moisture content of 18.5% to 21.8%; and
    packaging the chopped, sun dried tomatoes.

2. The process of claim 1, further comprising the step of seasoning the chopped sun dried tomatoes.

3. The process of claim 1, further comprising the step of storing the sun dried tomato slices prior to chopping.

4. The process of claim 3, wherein said storing further comprises placing the sun dried tomato slices in a cooler at 55° Fahrenheit.

5. The process of claim 1, wherein said picking tomatoes step is by hand.

6. The process of claim 1, wherein said washing step is with cold water.

7. The process of claim 1, wherein said slicing step further comprises slicing the picked tomatoes into halves.

8. The process of claim 1, wherein said drying step further comprises placing the sliced tomatoes in the sun at temperatures of 90° to 108° Fahrenheit for $3\frac{1}{2}$ days to $5\frac{1}{2}$ days.

9. The process of claim 1, further comprising the step of placing the sun dried tomatoes in a chopper having a knife with four blades and an end plate with a plurality of openings.

10. The process of claim 9, further comprising the step of finishing the chopping of the sun dried tomatoes by hand as the chopped sun dried tomatoes exit from the end plate.

11. The process of claim 1, further comprising the step of storing the packaged, chopped, sun dried tomatoes at 40° to 55° Fahrenheit until the packaged, chopped, sun dried tomatoes are shipped.

12. The process of claim 1, wherein said drying step further comprises drying the sliced tomatoes in a drying yard on drying screens.

13. The process of claim 1, wherein said chopping step produces chopped, sun dried tomato nodules $\frac{1}{4}''$ to $\frac{1}{2}''$ in size.

14. Chopped, sun dried tomatoes prepared by a process comprising the steps of:
    picking tomatoes of sufficient ripeness;
    washing the picked tomatoes and selecting tomatoes for further processing;
    slicing the picked tomatoes;
    drying the sliced tomatoes in open air under the sun until the tomato slices have a moisture content of 7% to 15%;
    selecting the sun dried tomato slices for chopping;
    chopping the selected sun dried tomato slices in a chopper to produce tomato nodules having a moisture content of 18.5% to 21.8%; and
    packaging the chopped, dried tomatoes.

15. Chopped, sun dried tomatoes as defined in claim 14 further comprising tomato nodules $\frac{1}{4}''$ to $\frac{1}{2}''$ in size.

* * * * *

UNITED STATES PATENT AND TRADEMARK OFFICE
CERTIFICATE OF CORRECTION

PATENT NO.  :  5,260,088

DATED       :  November 9, 1993

INVENTOR(S) :  David J. Bernard

It is certified that error appears in the above-identified patent and that said Letters Patent is hereby corrected as shown below:

On The Title Page Item [54] , after "PROCESS OF MAKING", delete "CHOPPER", and insert -- CHOPPED --.

Column 1, line 1, after "PROCESS OF MAKING", delete "CHOPPER" and insert -- CHOPPED --.

Column 2, line 48, after "present invention contain", delete "suit" and insert -- suitable --.

Column 5, line 22, after "for further processing" delete ":" and insert --  ; --.

Signed and Sealed this

Twenty-seventh Day of September, 1994

Attest:

BRUCE LEHMAN

*Attesting Officer*  *Commissioner of Patents and Trademarks*